(12) United States Patent
Li et al.

(10) Patent No.: US 12,309,365 B2
(45) Date of Patent: *May 20, 2025

(54) SAMPLE ADAPTIVE OFFSET

(71) Applicant: Shanghai Bilibili Technology Co., Ltd., Shanghai (CN)

(72) Inventors: Xiaobo Li, Shanghai (CN); Tianxiao Ye, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,326

(22) Filed: Jun. 21, 2023

(65) Prior Publication Data

US 2023/0336733 A1     Oct. 19, 2023

Related U.S. Application Data

(63) Continuation of application No. PCT/CN2022/077201, filed on Feb. 22, 2022.

(30) Foreign Application Priority Data

Mar. 17, 2021   (CN) .......................... 202110286137.8

(51) Int. Cl.
*H04N 19/132*     (2014.01)
*H04N 19/117*     (2014.01)
(Continued)

(52) U.S. Cl.
CPC ......... *H04N 19/117* (2014.11); *H04N 19/132* (2014.11); *H04N 19/182* (2014.11); *H04N 19/82* (2014.11)

(58) Field of Classification Search
None
See application file for complete search history.

(56) References Cited

U.S. PATENT DOCUMENTS 10,417,766 B2 *   9/2019   Lim .......................... H04N 7/01
11,412,218 B2 *   8/2022   Moon .................... H04N 19/70
(Continued)

FOREIGN PATENT DOCUMENTS

| CN | 103688543 A | 3/2014 |
| CN | 105141948 A | 12/2015 |

(Continued)

OTHER PUBLICATIONS

International Search Report with a mailing date of May 12, 2022, in International application No. PCT/CN2022/077201, filed on Feb. 22, 2022.

(Continued)

*Primary Examiner* — Mohammed Jebari
(74) *Attorney, Agent, or Firm* — McAndrews, Held & Malloy, Ltd.

(57) ABSTRACT

A method and an apparatus for sample adaptive offset, a device, and a medium are provided. An implementation is: obtaining a band value and a residual of each pixel in a target image; selecting a plurality of adjacent target pixels from the target image; and performing band information calculation operation for the plurality of adjacent target pixels, the band information calculation operation including: obtaining a maximum band value and a minimum band value of the plurality of target pixels; determining a plurality of preset band values based on the maximum band value and the minimum band value; and calculating band information for each of the plurality of preset band values based on the band values and the residuals of the plurality of target pixels.

18 Claims, 14 Drawing Sheets

(51) Int. Cl.
*H04N 19/182* (2014.01)
*H04N 19/82* (2014.01)

(56) References Cited

U.S. PATENT DOCUMENTS

| | | | | |
|---|---|---|---|---|
| 2011/0096834 A1* | 4/2011 | Cheon | ............... | H04N 19/63 |
| | | | | 375/E7.243 |
| 2013/0136173 A1* | 5/2013 | Matsunobu | .......... | H04N 19/176 |
| | | | | 375/240.08 |
| 2013/0188741 A1* | 7/2013 | Minoo | ................ | H04N 19/463 |
| | | | | 375/240.26 |
| 2013/0287101 A1* | 10/2013 | Bordes | ................ | H04N 19/597 |
| | | | | 375/240.12 |
| 2014/0119433 A1* | 5/2014 | Park | ...................... | H04N 19/44 |
| | | | | 375/240.02 |
| 2015/0215617 A1* | 7/2015 | Leontaris | ............ | H04N 19/147 |
| | | | | 375/240.03 |
| 2015/0229972 A1* | 8/2015 | Park | ...................... | H04N 19/50 |
| | | | | 375/240.12 |
| 2016/0182186 A1 | 6/2016 | Adler et al. | | |
| 2017/0099492 A1* | 4/2017 | Byun | ................... | H04N 19/172 |
| 2022/0020181 A1* | 1/2022 | Lee | ...................... | H04N 19/186 |
| 2023/0353746 A1* | 11/2023 | Li | ....................... | H04N 19/119 |

FOREIGN PATENT DOCUMENTS

| | | |
|---|---|---|
| CN | 106131554 A | 11/2016 |
| CN | 108206952 A | 6/2018 |
| CN | 111713097 A | 9/2020 |
| CN | 113068036 A | 7/2021 |
| EP | 4 246 972 A1 | 9/2023 |
| WO | 2016196138 A1 | 12/2016 |

OTHER PUBLICATIONS

The extended European search report for Application No. 22770269.3, dated May 16, 2024, European Patent Office, Germany (9 pages).
Chih-Ming Fu et al: "Sample adaptive offset for HEVC," Multimedia Signal Processing (MMSP), 2011 IEEE 13TH International Workshop on, IEEE, Oct. 17, 2011 (Oct. 17, 2011), pp. 1-5, XP03202754 7, DOI: 10.1109/MMSP.2011.6093807 ISBN: 978-1-4577-1432-0.
Adireddy Ramakrishna: "SAO Filtering inside CTU Loop for High Efficiency Video Coding :", Proceedings of the 10th International Conference on Signal Processing and Multimedia Applications and 10th International Conference on Wireless Information Networks and Systems, Jan. 1, 2013 (Jan. 1, 2013), pp. 19-22, XP093156922, DOI: 10.5220/0004613200190022 ISBN: 978-989-8565-7 4-7 Retrieved from the Internet: URL:https://www.scitepress.org/papers/2013/46132/46132.pdf.
Communication pursuant to Article 94(3) EPC for European Application No. 22 770 269.3, dated Feb. 25, 2025, European Patent Office, Germany (10 pages).
McCann (ZETCAST / Samsung) K et al: "Video coding technology proposal by Samsung (and BBC)", 1. JCT-VC Meeting; Apr. 15-Apr. 23, 2023 Dresden; No. JCTV-A124 Apr. 16, 2010 (Apr. 16, 2010), XP030233044, Retrieved from the Internet: URL:http://phenix.int-evry.fr/jct/doc_end_user/documents/1_Dresden/wg11ZJCTVC-A124.zip JCTV-A124_r2.doc [retrieved on Mar. 19, 2012].
C-Ming Fu et al: "TE10 subtest 3: Quadtree-based adaptive offset", 3, JCT-VC Meeting: Oct. 7, 2010-Oct. 15, 2010; XP030225797, Retrieved from the Internet: URL:http://phenix.int-evry.fr/jct/doc_end_user/documents/3_Guangzhou/wg11 /JCTVC-C147-m18173-v2-JCTV.zipJCTV_r1.doc [retrieved on Oct. 5, 2010].

* cited by examiner

| 113 | 117 | 165 | 200 | 203 | 202 | 205 | 210 | 211 | 210 | 212 | 214 | 216 | 215 | 214 | 214 |
| 124 | 115 | 126 | 182 | 208 | 204 | 207 | 209 | 211 | 210 | 210 | 212 | 214 | 215 | 214 | 212 |
| 131 | 121 | 104 | 124 | 191 | 211 | 204 | 208 | 210 | 209 | 211 | 215 | 214 | 215 | 215 | 214 |
| 175 | 124 | 117 | 112 | 134 | 185 | 201 | 197 | 203 | 211 | 207 | 207 | 212 | 213 | 212 | 211 |
| 183 | 155 | 129 | 122 | 113 | 134 | 185 | 199 | 199 | 211 | 213 | 211 | 212 | 211 | 209 | 211 |
| 174 | 176 | 158 | 126 | 120 | 112 | 134 | 190 | 208 | 207 | 213 | 214 | 212 | 209 | 208 | 213 |
| 182 | 177 | 182 | 156 | 128 | 125 | 118 | 132 | 180 | 206 | 206 | 208 | 211 | 211 | 210 | 214 |
| 185 | 175 | 186 | 189 | 154 | 128 | 124 | 123 | 145 | 182 | 205 | 210 | 212 | 211 | 211 | 214 |
| 186 | 176 | 181 | 184 | 186 | 158 | 124 | 126 | 133 | 156 | 192 | 207 | 209 | 212 | 212 | 210 |
| 180 | 173 | 173 | 181 | 180 | 180 | 153 | 126 | 122 | 117 | 156 | 205 | 210 | 206 | 209 | 212 |
| 180 | 172 | 173 | 190 | 184 | 181 | 192 | 160 | 127 | 121 | 119 | 155 | 202 | 207 | 203 | 208 |
| 179 | 178 | 179 | 187 | 181 | 169 | 175 | 177 | 152 | 125 | 119 | 121 | 156 | 198 | 209 | 210 |
| 196 | 191 | 180 | 185 | 190 | 181 | 177 | 179 | 184 | 155 | 127 | 122 | 131 | 172 | 203 | 210 |
| 195 | 187 | 185 | 195 | 188 | 178 | 178 | 173 | 177 | 182 | 153 | 128 | 123 | 116 | 151 | 200 |
| 196 | 187 | 187 | 202 | 191 | 172 | 177 | 180 | 171 | 170 | 180 | 163 | 132 | 128 | 139 | 170 |
| 190 | 187 | 184 | 196 | 195 | 183 | 180 | 179 | 178 | 177 | 190 | 198 | 162 | 132 | 125 | 131 |

| 14 | 14 | 20 | 25 | 25 | 25 | 25 | 26 | 26 | 26 | 26 | 26 | 27 | 26 | 26 | 26 |
|----|----|----|----|----|----|----|----|----|----|----|----|----|----|----|----|
| 15 | 14 | 15 | 22 | 26 | 25 | 25 | 26 | 26 | 26 | 26 | 26 | 26 | 26 | 26 | 26 |
| 16 | 15 | 13 | 15 | 23 | 26 | 25 | 26 | 26 | 26 | 26 | 26 | 26 | 26 | 26 | 26 |
| 21 | 15 | 14 | 14 | 16 | 23 | 25 | 24 | 25 | 26 | 25 | 25 | 26 | 26 | 26 | 26 |
| 22 | 19 | 16 | 15 | 14 | 16 | 23 | 24 | 24 | 26 | 26 | 26 | 26 | 26 | 26 | 26 |
| 21 | 22 | 19 | 15 | 15 | 14 | 16 | 23 | 26 | 25 | 26 | 26 | 26 | 26 | 26 | 26 |
| 22 | 22 | 22 | 19 | 16 | 15 | 14 | 16 | 22 | 25 | 25 | 26 | 26 | 26 | 26 | 26 |
| 23 | 21 | 23 | 23 | 19 | 16 | 15 | 15 | 18 | 22 | 25 | 26 | 26 | 26 | 26 | 26 |
| 23 | 22 | 22 | 23 | 23 | 19 | 15 | 15 | 16 | 19 | 24 | 25 | 26 | 26 | 26 | 26 |
| 22 | 21 | 21 | 22 | 22 | 22 | 19 | 15 | 15 | 14 | 19 | 25 | 26 | 25 | 26 | 26 |
| 22 | 21 | 21 | 23 | 23 | 22 | 24 | 20 | 15 | 15 | 14 | 19 | 25 | 25 | 25 | 26 |
| 22 | 22 | 22 | 23 | 22 | 21 | 21 | 22 | 19 | 15 | 14 | 15 | 19 | 24 | 26 | 26 |
| 24 | 23 | 22 | 23 | 23 | 22 | 22 | 23 | 23 | 19 | 15 | 15 | 16 | 21 | 25 | 26 |
| 24 | 23 | 23 | 24 | 23 | 22 | 22 | 24 | 22 | 22 | 19 | 16 | 15 | 14 | 18 | 25 |
| 24 | 23 | 23 | 25 | 23 | 21 | 22 | 25 | 21 | 21 | 22 | 20 | 16 | 16 | 17 | 21 |
| 23 | 23 | 23 | 24 | 24 | 22 | 22 | 22 | 22 | 22 | 23 | 24 | 20 | 16 | 15 | 16 |

FIG. 2c

| 208 | 206 | 206 | 209 | 211 | 209 | 207 | 207 | 207 | 205 | 200 | 215 | 210 | 151 | 118 | 119 |
|-----|-----|-----|-----|-----|-----|-----|-----|-----|-----|-----|-----|-----|-----|-----|-----|
| 210 | 211 | 210 | 210 | 213 | 212 | 210 | 208 | 208 | 205 | 204 | 206 | 217 | 206 | 147 | 116 |
| 213 | 215 | 213 | 213 | 216 | 216 | 210 | 207 | 209 | 206 | 202 | 207 | 207 | 208 | 191 | 130 |
| 213 | 216 | 214 | 213 | 215 | 215 | 213 | 209 | 209 | 211 | 207 | 204 | 206 | 206 | 197 | 162 |
| 211 | 214 | 215 | 213 | 215 | 212 | 210 | 211 | 209 | 215 | 214 | 207 | 207 | 206 | 206 | 204 |
| 214 | 211 | 212 | 214 | 214 | 215 | 215 | 214 | 212 | 213 | 212 | 208 | 210 | 208 | 200 | 201 |
| 216 | 215 | 214 | 213 | 214 | 215 | 215 | 213 | 210 | 214 | 214 | 211 | 211 | 207 | 201 | 199 |
| 215 | 211 | 211 | 215 | 215 | 215 | 216 | 213 | 211 | 210 | 210 | 211 | 211 | 210 | 207 | 201 |
| 213 | 213 | 211 | 213 | 215 | 215 | 215 | 215 | 214 | 214 | 213 | 214 | 213 | 209 | 210 | 207 |
| 213 | 215 | 216 | 216 | 216 | 216 | 216 | 217 | 217 | 215 | 214 | 215 | 215 | 213 | 213 | 208 |
| 212 | 213 | 213 | 213 | 213 | 215 | 216 | 217 | 216 | 216 | 217 | 216 | 216 | 214 | 212 | 210 |
| 211 | 213 | 215 | 214 | 213 | 216 | 218 | 218 | 216 | 215 | 216 | 217 | 217 | 213 | 216 | 215 |
| 210 | 212 | 214 | 214 | 215 | 216 | 217 | 218 | 216 | 216 | 217 | 218 | 216 | 211 | 212 | 215 |
| 208 | 205 | 204 | 209 | 210 | 211 | 215 | 217 | 216 | 216 | 215 | 216 | 215 | 211 | 211 | 213 |
| 202 | 208 | 211 | 210 | 209 | 212 | 212 | 214 | 215 | 215 | 215 | 216 | 216 | 212 | 211 | 211 |
| 159 | 194 | 218 | 210 | 211 | 213 | 214 | 214 | 215 | 216 | 216 | 217 | 216 | 214 | 213 | 211 |

FIG. 2d

| 26 | 25 | 25 | 26 | 26 | 26 | 25 | 25 | 25 | 25 | 25 | 26 | 26 | 18 | 14 | 14 |
|----|----|----|----|----|----|----|----|----|----|----|----|----|----|----|----|
| 26 | 26 | 26 | 26 | 26 | 26 | 26 | 26 | 26 | 25 | 25 | 25 | 27 | 25 | 18 | 14 |
| 26 | 26 | 26 | 26 | 27 | 27 | 26 | 25 | 26 | 25 | 25 | 25 | 25 | 26 | 23 | 16 |
| 26 | 27 | 26 | 26 | 26 | 26 | 26 | 26 | 26 | 26 | 25 | 25 | 25 | 25 | 24 | 20 |
| 26 | 26 | 26 | 26 | 26 | 26 | 26 | 26 | 26 | 26 | 26 | 25 | 25 | 25 | 25 | 25 |
| 26 | 26 | 26 | 26 | 26 | 26 | 26 | 26 | 26 | 26 | 26 | 26 | 26 | 26 | 25 | 25 |
| 27 | 26 | 26 | 26 | 26 | 26 | 26 | 26 | 26 | 26 | 26 | 26 | 26 | 26 | 25 | 24 |
| 26 | 26 | 26 | 26 | 26 | 26 | 27 | 26 | 26 | 26 | 26 | 26 | 26 | 26 | 25 | 25 |
| 26 | 26 | 26 | 26 | 26 | 26 | 26 | 26 | 26 | 26 | 26 | 26 | 26 | 26 | 26 | 25 |
| 26 | 26 | 27 | 27 | 27 | 27 | 27 | 27 | 27 | 26 | 26 | 26 | 26 | 26 | 26 | 26 |
| 26 | 26 | 26 | 26 | 26 | 26 | 27 | 27 | 27 | 27 | 27 | 27 | 27 | 26 | 26 | 26 |
| 26 | 26 | 26 | 26 | 26 | 27 | 27 | 27 | 27 | 26 | 27 | 27 | 27 | 26 | 27 | 26 |
| 26 | 26 | 26 | 26 | 26 | 27 | 27 | 27 | 27 | 27 | 27 | 27 | 27 | 26 | 26 | 26 |
| 26 | 25 | 25 | 26 | 26 | 26 | 26 | 27 | 27 | 27 | 26 | 27 | 26 | 26 | 26 | 26 |
| 25 | 26 | 26 | 26 | 26 | 26 | 26 | 26 | 26 | 26 | 26 | 27 | 27 | 26 | 26 | 26 |
| 19 | 24 | 28 | 26 | 26 | 26 | 26 | 26 | 26 | 27 | 27 | 27 | 27 | 26 | 26 | 26 |

Determine a band mask of the plurality of target pixels that corresponds to the preset band value — S601

Perform a calculation on the preset band value and the plurality of target pixels based on the plurality of target pixels and the band mask corresponding to the preset band value to obtain the band information for the preset band value of the plurality of target pixels — S602

FIG. 6

| -3 | -9 | 14 | 26 | 78 | -23 | -1 | 2 |
|---|---|---|---|---|---|---|---|

FIG. 9a

| 3 | 2 | 1 | 0 | 1 | 6 | 30 | 15 | 20 | 24 | 22 | 16 | 17 | 18 | 0 | 1 |
|---|---|---|---|---|---|---|---|---|---|---|---|---|---|---|---|

FIG. 9b

SAMPLE ADAPTIVE OFFSET

CROSS-REFERENCE TO RELATED APPLICATIONS

This application is a continuation under 35 U.S.C. 111(a) of PCT International Application No. PCT/2022/077201, filed on Feb. 22, 2022, which claims priority to Chinese Patent Application No. 202110286137.8, filed with the China National Intellectual Property Administration on Mar. 17, 2021, the entire contents of which are hereby incorporated by reference in their entirety for all purpose.

TECHNICAL FIELD

The present disclosure relates to the field of video processing technologies, in particular to the field of video coding technologies, and specifically to sample adaptive offset.

BACKGROUND

In the related technologies, prediction, transformation, quantization, inverse quantization, inverse transformation, reconstruction, entropy encoding and other processing can be performed on a video frame in a video encoding process, and entropy decoding, inverse quantization, inverse transformation and other processing can be performed on the video frame in a video decoding process. For a boundary area of the video frame where the pixel value changes drastically, ripples may be generated in the boundary area of a reconstructed frame due to the loss of high-frequency components during the encoding process. This distortion is called the ringing effect.

The Sample Adaptive Offset (SAO for short) algorithm can offset the reconstructed frame, so as to reduce or even remove the ripples in the reconstructed frame. In order to reduce or even remove the ripples in the reconstructed frame, inverse quantization, inverse transformation, and reconstruction can be performed at the encoder to obtain the reconstructed frame. The reconstructed frame can be divided into a plurality of image blocks, and SAO information of each image block can be determined based on the reconstructed frame and the original video frame. The encoder can perform entropy encoding on the SAO information of each image block, and send it to the decoder in the encoded stream, so that the decoder can perform entropy decoding on the received encoded stream to obtain the SAO information, thereby offsetting the corresponding image blocks in the reconstructed frame to reduce or even remove the ripples in the reconstructed frame.

The methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides a method and apparatus for sample adaptive offset, an electronic device, a computer-readable storage medium, and a computer program product.

According to an aspect of the present disclosure, there is provided a method for sample adaptive offset, including: obtaining a band value and a residual of each pixel in a target image; selecting a plurality of adjacent target pixels from the target image; and performing band information calculation operation for the plurality of adjacent target pixels, the band information calculation operation comprising: obtaining a maximum band value and a minimum band value of the plurality of target pixels; determining a plurality of preset band values based on the maximum band value and the minimum band value; and calculating band information for each of the plurality of preset band values based on the band values and the residuals of the plurality of target pixels.

According to another aspect of the present disclosure, there is further provided an electronic device, including: at least one processor; and a memory communicatively connected to the at least one processor, where the memory stores a computer program that, when executed by the at least one processor, implements the above method.

According to another aspect of the present disclosure, there is further provided a non-transitory computer-readable storage medium storing a computer program, where when the computer program is executed by a processor, the above method is implemented.

It should be understood that the content described in this section is not intended to identify critical or important features of the embodiments of the present disclosure, and is not used to limit the scope of the present disclosure either. Other features of the present disclosure will be easily understood through the following description.

BRIEF DESCRIPTION OF THE DRAWINGS

The accompanying drawings exemplarily show embodiments and form a part of the specification, and are used to explain exemplary implementations of the embodiments together with a written description of the specification. The embodiments shown are merely for illustrative purposes and do not limit the scope of the claims. Throughout the accompanying drawings, the same reference numerals denote similar but not necessarily same elements.

FIG. 2c shows a calculated band value of each pixel in an image block in FIG. 2b;

FIG. 2d is a schematic diagram of another image block of a reconstructed frame according to some embodiments of the present disclosure;

FIG. 2e shows a calculated band value of each pixel in an image block in FIG. 2d;

FIG. 6 is a flowchart of a method for calculating band information for a preset band value according to some embodiments of the present disclosure;

FIG. 9*a* is a schematic diagram of an accumulated residual matrix according to some embodiments of the present disclosure;

FIG. 9*b* is a schematic diagram of a accumulated number matrix according to some embodiments of the present disclosure;

DETAILED DESCRIPTION OF EMBODIMENTS

Exemplary embodiments of the present disclosure are described below in conjunction with the accompanying drawings, where various details of the embodiments of the present disclosure are included to facilitate understanding, and should only be considered as exemplary. Therefore, those of ordinary skill in the art should be aware that various changes and modifications can be made to the embodiments described herein, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not defined, there may be one or more elements, unless otherwise expressly indicated in the context. Moreover, the term "and/or" used in the present disclosure encompasses any of and all possible combinations of listed items.

The embodiments of the present disclosure will be described below in detail with reference to the accompanying drawings.

For ease of understanding, a brief description of a video encoding process is given first.

Figure 1A:
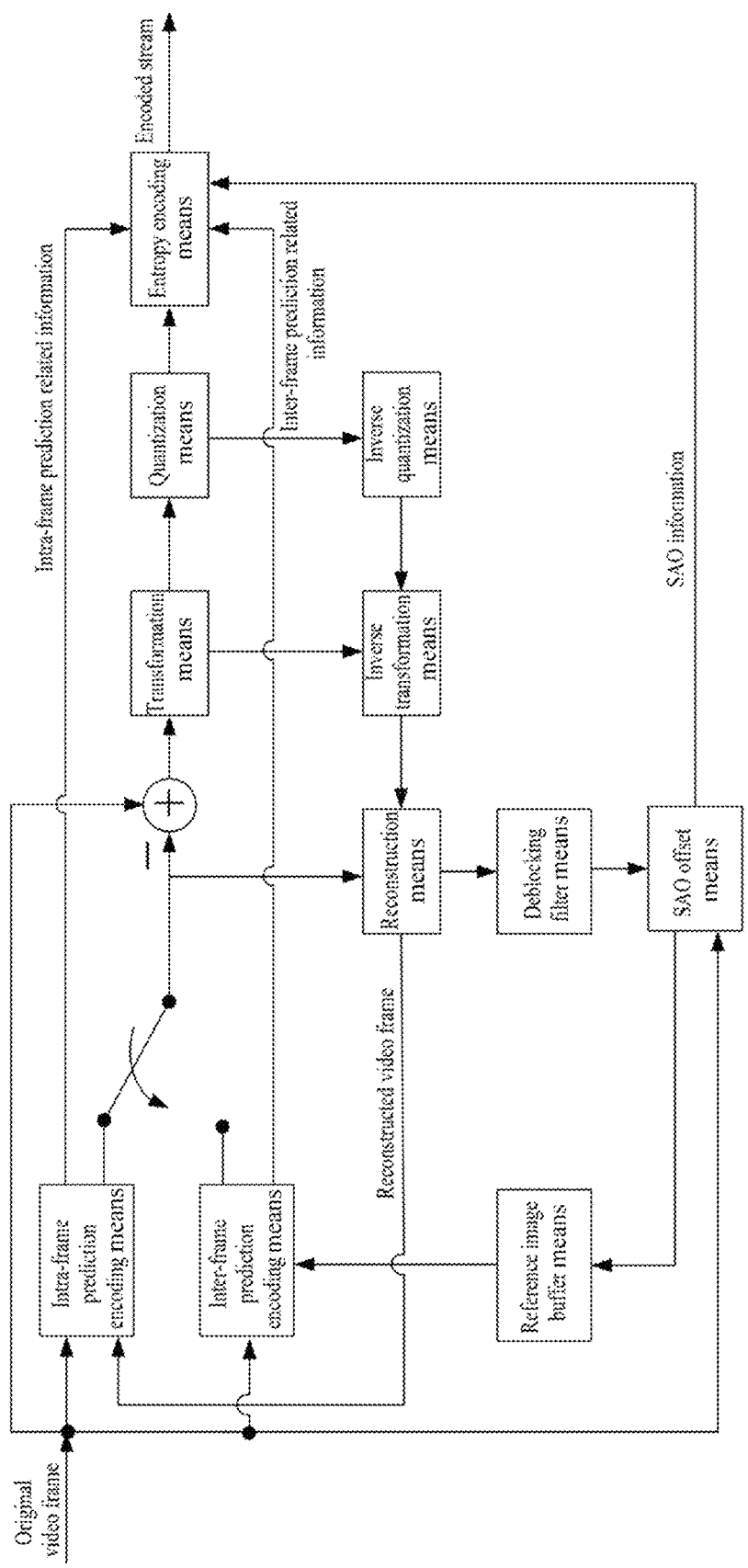
FIG. 1a is a schematic structural diagram of an encoder according to some embodiments of the present disclosure.

The general process of video encoding is as follows: An original video frame is divided into a plurality of image blocks, and encoded in encoding units of image blocks. The image block may be, for example, a square image with a size of 16×16, 32×32, or 64×64, or a rectangular image. As shown in FIG. 1*a*, an encoder may perform prediction, transformation, quantization, entropy encoding, inverse quantization, inverse transformation, reconstruction, filtering and other processing on the original video frame. Accordingly, the encoder may include an intra-frame prediction encoding module, an inter-frame prediction encoding module, a transformation module, a quantization module, an entropy encoding module, an inverse quantization module, an inverse transformation module, a reconstruction module, a filtering module, and a reference image buffer module.

The intra-frame prediction encoding module may determine intra-frame prediction data and intra-frame prediction related information and the inter-frame prediction encoding module may determine inter-frame prediction data and inter-frame prediction related information. The intra-frame prediction encoding module or inter-frame prediction encoding module may be selected for use by using a switch, prediction data output by the selected prediction module is used as one of the inputs of an adder, the original video frame is used as another input of the adder, and the adder outputs a predicted residual. The predicted residual is transformed and quantized to obtain a quantization coefficient. The quantization coefficient, the intra-frame prediction related information, and the inter-frame prediction related information are input into the entropy encoding module, and an encoded stream is obtained through the entropy encoding and sent to the decoder. The reconstruction module at the encoder may add the predicted residual back to the corresponding intra-frame prediction data or inter-frame prediction data to obtain a reconstructed frame.

It should be noted that the predicted residual here is calculated based on the predicted frame and the original video frame, which is different from the residual calculated based on the reconstructed frame and the original video frame below.

Figure 1B:
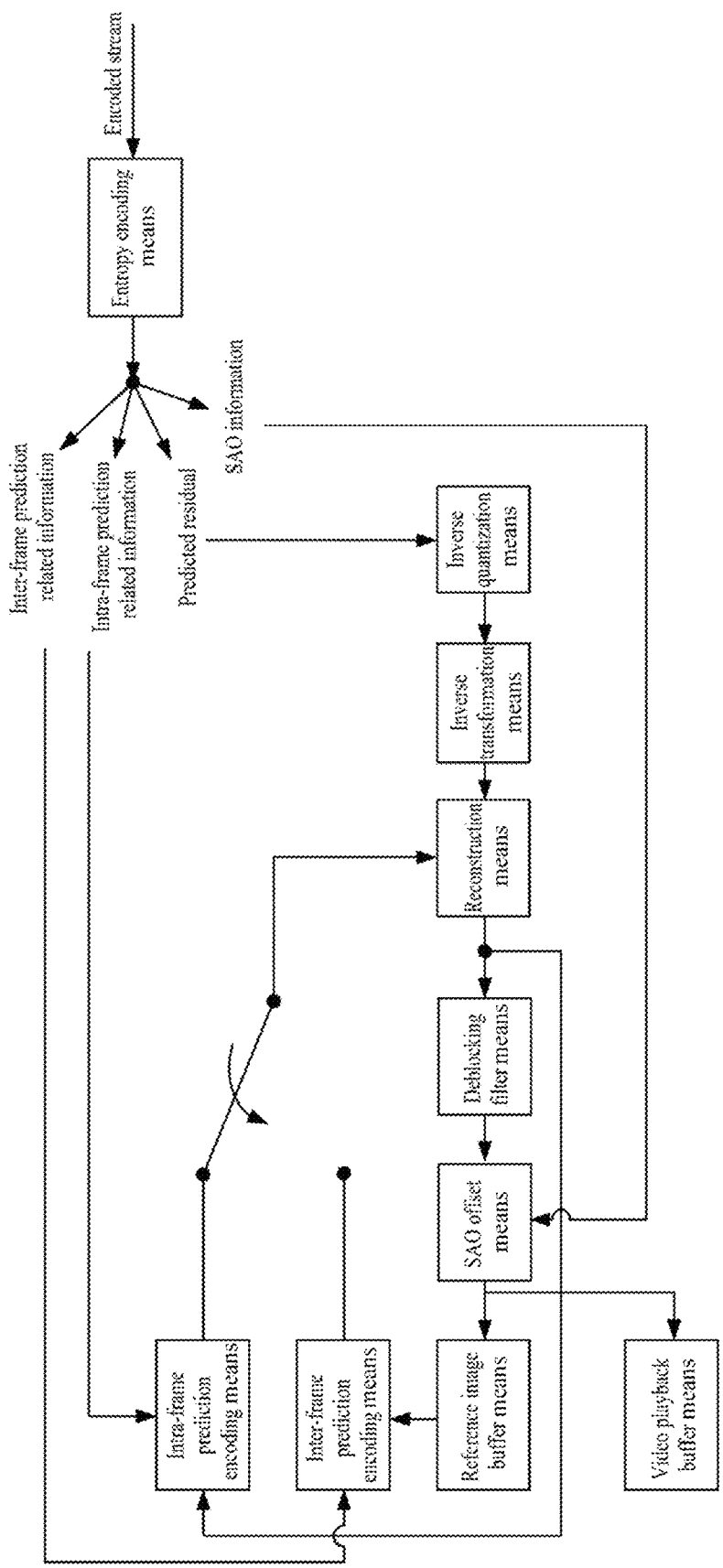
FIG. 1b is a schematic structural diagram of a decoder according to some embodiments of the present disclosure.

The general process of video decoding is as follows: As shown in FIG. 1*b*, the received encoded stream is first entropy decoded to obtain a quantization coefficient (for example, which may include the predicted residual in FIG. 1*b*), inter-frame prediction related information, intra-frame prediction related information, etc. The quantization coefficient is inverse quantized and inverse transformed to restore the predicted residual. The reconstruction module adds the predicted residual back to the corresponding intra-frame prediction data or inter-frame prediction data. The intra-frame prediction data or inter-frame prediction data may be selected for use by using a switch to obtain the reconstructed frame. Accordingly, the decoder may include an intra-frame prediction decoding prediction module, an inter-frame prediction decoding module, an entropy decoding module, an inverse quantization module, an inverse transformation module, a reconstruction module, a filtering module, a reference image buffer module, and a video playback buffer module.

Due to the loss of high-frequency components during the transformation and quantization at the decoder, ripples may be generated in the reconstructed frame due to the ringing effect.

In order to solve the above technical problems, as shown in FIG. 1*a*, the encoder may perform filtering processing on the reconstructed frame, and the filtering processing may include Deblocking Filter (DF for short) processing, Sample Adaptive Offset (SAO for short) processing, the SAO processing is used to obtain SAO information, and the SAO information is entropy encoded and sent to the decoder. Accordingly, the encoder may further include a DF module and an SAO offset module. The decoder may perform entropy decoding on the received encoded stream to obtain the SAO information.

SAO may offset the reconstructed frame, so as to reduce or even remove the ripples in the reconstructed frame. In order to reduce or even remove the ripples in the reconstructed frame, the reconstructed frame is divided into a plurality of image blocks at the encoder, and the SAO information corresponding to each image block may be determined sequentially. The encoder may send the SAO information of each image block to the decoder, such that the decoder can offset each image block in the reconstructed frame based on the corresponding SAO information, so as to reduce or even remove the ripples in the reconstructed frame.

Any video frame may be composed of three different components, for example, a YUV video frame is composed of a luminance component (Y), a first chrominance component (U), and a second chrominance component (V). Therefore, the SAO information may also include three different types of component information, for example, luminance component information, first chrominance component information, and second chrominance component information.

A video frame may include a plurality of image blocks of different components, for example, a YUV video frame may include a luminance image block, a first chrominance image block, and a second chrominance image block. Image blocks of different components in the reconstructed frame may each be offset through SAO processing.

SAO may be applicable to, but not limited to, High Efficient Video Coding (HEVC for short). HEVC can provide higher compression efficiency than previous generations of coding technologies. HEVC can provide a video having the same definition as H.264 at half the bit rate, which can save a large storage space and video transmission bandwidth.

SAO may include Band Offset (BO offset for short). The general process of BO offset may be as follows: A pixel value range is divided equally into a plurality of bands by classification based on the pixel values. For example, an 8-bit image is used as an example. A pixel value range is [0, 255], and it may be set that each band contains eight pixel values, and the kth band has a pixel value range of [8 k, 8 k+7], which is similar to a quantification technique. In the encoding process, it is necessary to count the residuals and the number of pixels of 0-31 bands of a current image block (CTB). For BO offset, SAO information is band information, which may include the residuals and the number of pixels of 0-31 bands in the current image block.

Since there are 32 bands in BO offset, which exceeds the number of vector registers. In related technologies, the residuals and the number of pixels of 0-31 bands of a current image block (CTB) can be counted based on C language, which may be as follows: For the current image block, two temporary arrays: stats[32] and count[32] are defined, and each has an initial value of 0; a band value bt of a current pixel is calculated, and for example, for an 8-bit pixel, a reconstructed pixel value is 15, and therefore bt=15/8=1; a difference between the current reconstructed pixel and the original pixel, that is, a residual diff, is calculated; and the residuals are accumulated and the number of pixels is calculated: stats[bt]+=diff; count[bt]++. It can be seen that, a residual for each pixel needs to be calculated and added to the accumulated residual sum for the corresponding band value, and the number of pixels for the corresponding band value is added by 1, causing the computational complexity very high.

In view of this, the inventor finds through research that for each image block, although pixel values of a plurality of adjacent reconstructed pixels are mostly different, most of them belong to the same band, but not completely belong to the same band. For some special areas, such as flat areas, most of a plurality of adjacent reconstructed pixels are located in several consecutive bands.

Figures 2A, 2B:
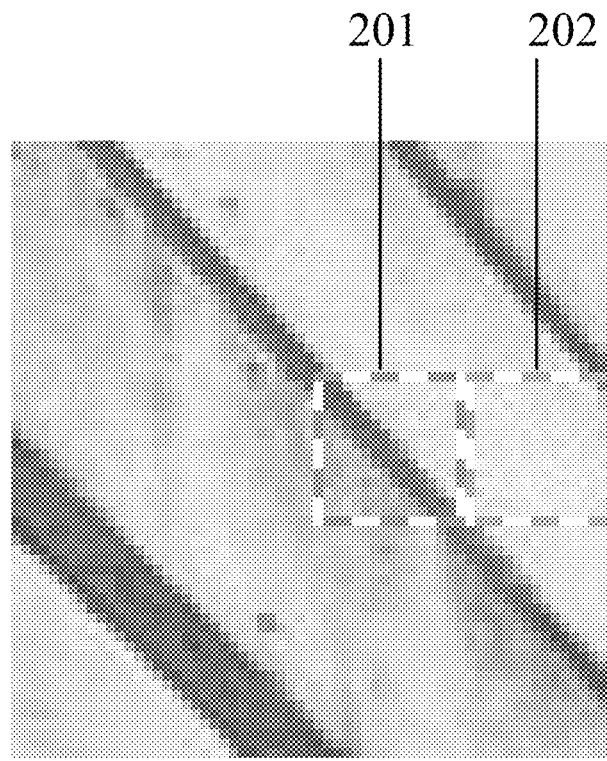
FIG. 2a is a schematic diagram of a video frame to be encoded according to some embodiments of the present disclosure.
FIG. 2b is a schematic diagram of an image block of a reconstructed frame according to some embodiments of the present disclosure.

FIG. 2a shows a video frame to be encoded according to some embodiments of the present disclosure, with an 8-bit image used as an example. FIG. 2b shows pixel values of reconstructed pixels of a luminance CTB defined by the dashed box 201 in FIG. 2a, and for the convenience of presentation, only a 16×16 area is shown in FIG. 2b. FIG. 2c shows a band value of each reconstructed pixel in the luminance CTB illustrated in FIG. 2b.

It can be seen from FIG. 2b that the pixel values (for example, of the luminance components) of the reconstructed pixels in the luminance CTB defined by the dashed box 201 are mostly different. However, it can be seen from FIG. 2c that most of the plurality of adjacent reconstructed pixels belong to the same band, but not completely belong to the same band. For example, most of the reconstructed pixels in the 2nd row and the 3rd row belong to the same band 26, but not completely belong to the same band.

FIG. 2d shows pixel values of reconstructed pixels of the luminance CTB defined by the dashed box 202 in FIG. 2a, and likewise, for the convenience of presentation, only a 16×16 area is shown in FIG. 2d. FIG. 2e shows a band value of each reconstructed pixel in the luminance CTB illustrated in FIG. 2d.

It can be seen from FIG. 2e that most of the plurality of adjacent reconstructed pixels in the luminance CTB defined by the dashed box 201 are located in several consecutive bands.

The above only uses the luminance component of the reconstructed frame as an example to illustrate the distribution characteristics of the band values of the plurality of adjacent reconstructed pixels. It is easy to understand that the band values of other components of the reconstructed frame (such as the first chrominance component and the second chrominance component) also have the above distribution characteristics.

In view of this discovery, the present disclosure provides an improved method for sample adaptive offset. According to the method, the plurality of adjacent target pixels are selected from the target image, the maximum band value and the minimum band value of the plurality of target pixels are obtained, the plurality of preset band values are determined based on the maximum band value and the minimum band value, and the band information for each preset band value is calculated. Therefore, the maximum band value and the minimum band value of the plurality of adjacent pixels are determined, and the plurality of preset band values are determined based on the maximum band value and the minimum band value, so that only the band information for the plurality of preset band values need to be calculated, without a need to calculate the band information for all band values, which greatly reduces the computational complexity and significantly improves the efficiency of the algorithm. A video frame is an image, and the video frame and the image may be used interchangeably in the embodiments of the present disclosure. The target image in the embodiments of the present disclosure may be the entire video frame, or a part of the video frame.

The method for sample adaptive offset in the embodiments of the present disclosure will be described in detail below with reference to the accompanying drawings.

As for the method for sample adaptive offset, the method itself does not necessarily perform adaptive offset, but is used for adaptive offset, for example, it may perform a preparation for adaptive offset.

Figure 3:
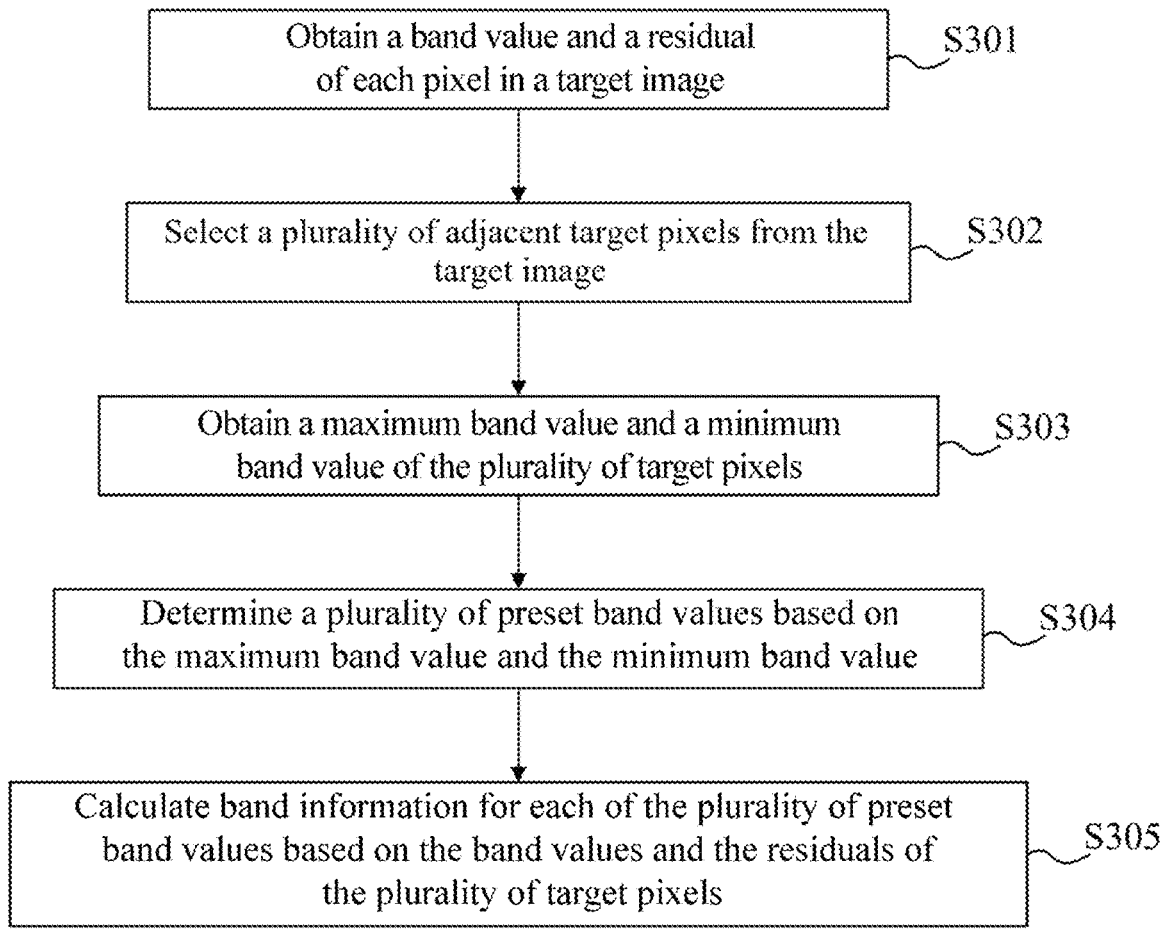
FIG. 3 is a flowchart of a method for sample adaptive offset according to some embodiments of the present disclosure.

FIG. 3 is a flowchart of a method for sample adaptive offset according to some embodiments of the present disclosure. As shown in FIG. 3, the method may include: step S301: obtaining a band value and a residual of each pixel in a target image; step S302: selecting a plurality of adjacent target pixels from the target image; and performing band information calculation operation for the plurality of adjacent target pixels, the band information calculation operation comprising: step S303: obtaining a maximum band value and a minimum band value of the plurality of target pixels; step S304: determining a plurality of preset band values based on the maximum band value and the minimum band value; and step S305: calculating band information for each of the plurality of preset band values based on the band values and the residuals of the plurality of target pixels. Therefore, the maximum band value and the minimum band value of the plurality of adjacent pixels are determined, and the plurality of preset band values are determined based on the maximum band value and the minimum band value, so that only the band information for the plurality of preset band values need to be calculated, without a need to calculate the band information for all band values, which greatly reduces the computational complexity and significantly improves the efficiency of the algorithm.

The target image may be, but not limited to, an image block of a video frame. The target image may be, for example, a luminance image block of a video frame, or an image block of another component. For example, for a YUV video frame, the target image may alternatively be a first chrominance image block or a second chrominance image block.

The target image may be an image block in a reconstructed frame obtained by reconstruction at the encoder, and the residual of each target pixel of the target image may be calculated based on the reconstructed frame and the original video frame. The reconstructed frame has the same size as the original video frame and they include the same number of pixels. The value of the pixel in the reconstructed frame is the reconstructed pixel value of the pixel at the corresponding position in the original video frame, and the exemplary reconstruction process has been described above.

For ease of description and understanding, in the embodiments of the present disclosure, a pixel in the reconstructed frame and a pixel at the corresponding position in the original video frame are referred to as the same pixel.

The residual of a pixel may be a difference between a reconstructed pixel value of the pixel in the reconstructed frame and an original pixel value of the pixel in the original video frame. The residual of the pixel may be positive, 0, or negative.

An 8-bit image is used as an example. A pixel value range is [0, 255], and it may be set that each band includes eight pixel values, and the kth band has a pixel value range of [8 k, 8 k+7]. The pixel value may be divided by 8 and rounded, for example, the pixel whose pixel value is 15 has a band value of 2. It should be noted that this is only an example to illustrate how to calculate a band value of a pixel, and a method for dividing bands is not limited to only the one described above, and according to actual requirements, a method for dividing the pixel value range can be set based on the pixel value range to determine the band value of the pixel.

According to some embodiments, step S302 may include: dividing the pixels of the target image into a plurality of pixel groups, each pixel group including a plurality of adjacent target pixels. Therefore, the target image is pre-divided into a plurality of pixel groups, so that it is possible to divide the interval of band values of the target image based on the pixel groups, which improves the efficiency of the algorithm. Further, band information of a plurality of adjacent target pixels included in each pixel group may be calculated.

Exemplarily, a plurality of pixels in each row of the target image may, but not limited to, be classified into at least one pixel group, that is, a plurality of target pixels included in each pixel group are located in the same row. It can be understood that, the plurality of target pixels included in each pixel group may alternatively be distributed as a plurality of rows of pixels (including two rows of pixels) of the target image. The plurality of target pixels included in each pixel group may be distributed in a matrix. For example, an image block of the reconstructed frame illustrated in FIG. 2d is used as an example. For example, a plurality of pixels in each row may be determined as a pixel group, and therefore each pixel group includes 16 pixels located in the same row. The image block in FIG. 2d may alternatively be divided into a plurality of pixel groups each distributed in a 2*8 matrix, that is, each pixel group includes two rows of pixels, and each row of pixels includes eight pixels. A method of dividing the target image into a plurality of pixel groups is not limited here, and may be determined according to actual requirements.

According to some embodiments, the method may further include: determining the band information of the target image based on the respective plurality of band information of the plurality of pixel groups; and encoding the band information of the target image for sending to the decoder. Therefore, the band information of the target image is calculated based on the pixel groups, and the technical solutions of the present disclosure can simplify the computational complexity of the band information of each pixel group, thereby simplifying the computational complexity for the target image. An exemplary implementation of how to determine the band information of the target image based on the respective pieces of band information of the plurality of pixel groups will be described in detail below.

After the plurality of adjacent target pixels (which may be one pixel group of the target image) are selected, the band information calculation operation may be performed for the plurality of target pixels.

Figure 4:
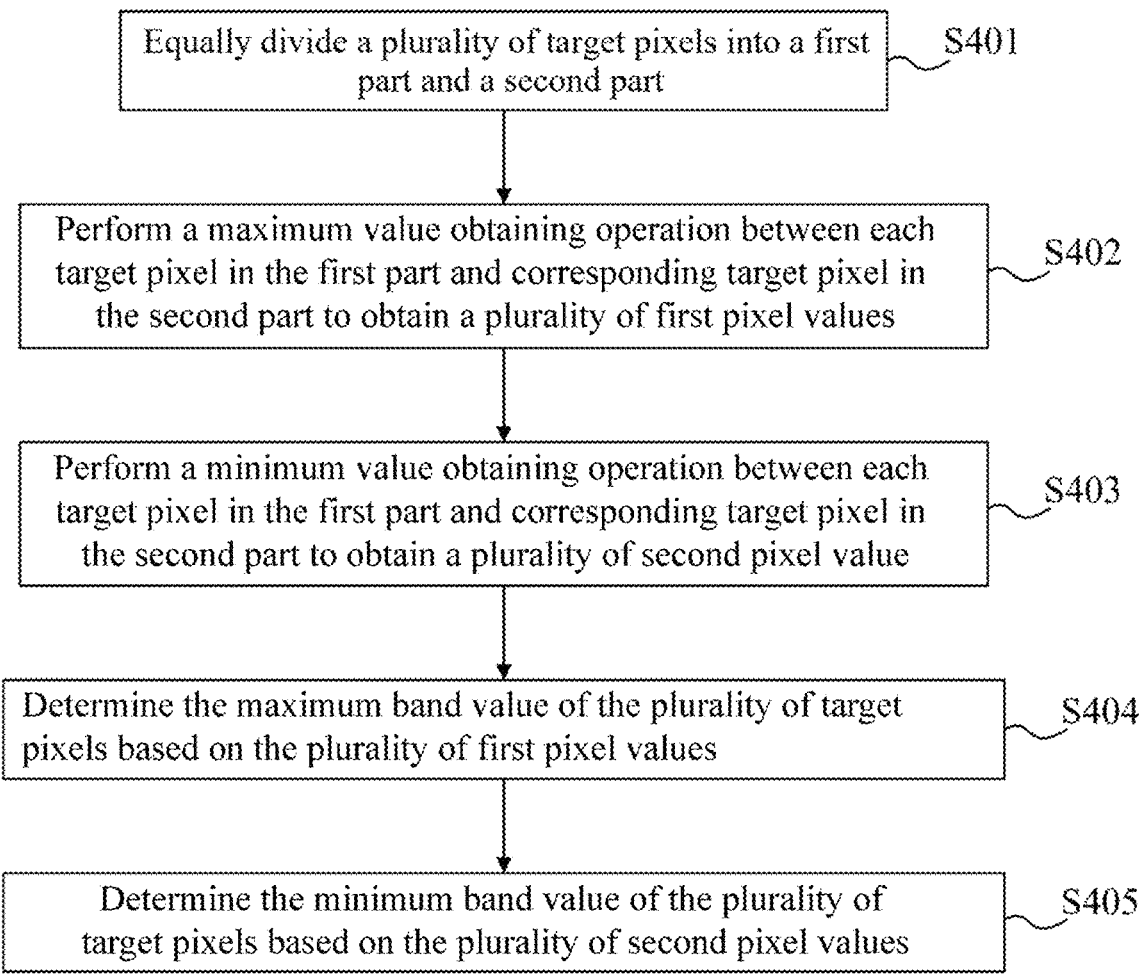
FIG. 4 is a flowchart of a method for obtaining a maximum band value and a minimum band value of a plurality of target pixels according to some embodiments of the present disclosure.

According to some embodiments, the number of the plurality of adjacent target pixels selected in step S302 may be an even number. In this case, as shown in FIG. 4, step S303 of obtaining the maximum band value and a minimum band value of the plurality of target pixels may include: step S401: equally dividing the plurality of target pixels into a first part and a second part; step S402: performing a maximum value obtaining operation between each target pixel in the first part and corresponding target pixel in the second part to obtain a plurality of first pixel values; step S403: performing a minimum value obtaining operation between each target pixel in the first part and corresponding target pixel in the second part to obtain a plurality of second pixel values; step S404: determining the maximum band value of the plurality of target pixels based on the plurality of first pixel values; and step S405: determining the minimum band value of the plurality of target pixels based on the plurality of second pixel values. Therefore, the plurality of target pixels are equally divided into two parts, and a maximum value obtaining operation and a minimum value obtaining operation are performed for the corresponding two target pixels in the two equally divided parts, so that the maximum band value and the minimum band value can be obtained based on half the number of pixels, and the calculation amount for obtaining the maximum band value and the minimum band value can be reduced. In addition, the maximum band value and the minimum band value of the plurality of adjacent target pixels can be quickly determined, further improving the efficiency of the algorithm.

For example, that a plurality of adjacent target pixels are located in the same row is used as an example. The first half of the plurality of target pixels may be used as the first part, and the second half of the plurality of target pixels may be used as the second part. In the embodiment illustrated in FIG. 5, the plurality of adjacent target pixels 500 are the last row of pixels in FIG. 2e, and the process of obtaining the maximum band value and the minimum band value of the plurality of target pixels 500 may be as follows: equally dividing the plurality of target pixels to obtain a first part 501 and a second part 502; performing a maximum value obtaining operation for each target pixel in the first part 501 and the corresponding target pixel in the second part 502 to obtain eight first pixel values: 26, 27, 28, 27, 27, 26, 26 and 26; performing a minimum value obtaining operation for each target pixel in the first part 501 and the corresponding target pixel in the second part 502 to obtain eight second pixel values: 19, 24, 27, 26, 26, 26, 26 and 26; determining the maximum band value max of the plurality of target pixels to be 28 based on the eight first pixel values; and determining the minimum band value min of the plurality of target pixels to be 19 based on the eight second pixel values.

It can be understood that the number of the plurality of adjacent target pixels is not limited to an even number, and may alternatively be an odd number. Exemplarily, in a case that the number of the plurality of adjacent target pixels is an odd number, the method for obtaining the maximum band value and the minimum band value of the plurality of target pixels is similar to that described above, for example, it may be as follows: a plurality of adjacent target pixels are divided into a first part and a second part, and a difference between the number of pixels in the first part and the number of pixels in the second part may be, but not limited to, 1. Likewise, a maximum value obtaining operation may be performed for each target pixel in the first part and the corresponding target pixel in the second part to obtain a plurality of first pixel values, and a minimum value obtaining operation may be performed for each target pixel in the first part and the corresponding target pixel in the second part to obtain a plurality of second pixel values. In contrast to the above, the maximum band value of the plurality of target pixels can be determined based on the plurality of first pixel values and one redundant target pixel in the first part (the target pixel has no corresponding target pixel in the second part), and the minimum band value of the plurality of target pixels can be determined based on the plurality of second pixel values and the one redundant target pixel in the first part.

After the maximum band value and the minimum band value of the plurality of adjacent target pixels are determined, step S304 may be performed to determine a plurality of preset band values based on the maximum band value and the minimum band value.

According to some embodiments, the plurality of preset band values determined in step S304 may include the maximum band value max and the minimum band value min of the plurality of target pixels, and one or more band values between the maximum band value max and the minimum band value min. For example, the plurality of preset band values may include all integers within the interval [min, max].

After the plurality of preset band values are determined based on the maximum band value and the minimum band value of the plurality of adjacent target pixels, step S305 may be performed to calculate band information for each of the plurality of preset band values.

According to some embodiments, as shown in FIG. 6, step S305 of calculating band information for each of the plurality of preset band values based on the band values and the residuals of the plurality of target pixels may include: step S601: determining a band mask of the plurality of target pixels that corresponds to the preset band value, the band mask being capable of representing a position of a target pixel of the plurality of target pixels whose band value is the preset band value; and step S602: performing a calculation on the preset band value and the plurality of target pixels based on the plurality of target pixels and the band mask corresponding to the preset band value to obtain the band information for the preset band value of the plurality of target pixels. Therefore, calculation for both the preset band value and the plurality of target pixels can be implemented based on the band mask corresponding to the preset band value, which implements the optimization of the instruction set, and can greatly reduce the number of memory accesses and computational complexity compared to the independent calculation for each pixel in the related art, and significantly improve the efficiency of the algorithm.

Exemplarily, a plurality of mask pixels included in the band mask corresponding to each preset band value are in a one-to-one correspondence with the plurality of adjacent target pixels, a value of a mask pixel of the band mask that corresponds to the target pixel of the plurality of target pixels whose band value is the preset band value is a set value, and a value of a mask pixel corresponding to the target pixel of the plurality of target pixels whose band value is not the preset band value is zero. The set value may be, for example, but not limited to, 1, to simplify the calculation of the band information, see band mask 701 in FIG. 7.

According to some embodiments, the plurality of adjacent target pixels may be distributed in a matrix. In this case, step S601 of determining the band mask of the plurality of target pixels that corresponds to the preset band value may include: constructing a band matrix having the same size as the matrix of the plurality of target pixels, values of elements in the band matrix being equal to the preset band value; and determining the band mask based on a result of comparison between the band values of the plurality of target pixels and corresponding elements in the band matrix. Therefore, the band matrix in which the element values are all the preset band value is constructed, and the band values of the plurality of target pixels are compared with the values of corresponding elements in the band matrix, so that whether there is a target pixel whose band value being the preset band value can be determined, and a position of at least one target pixel whose band value being the preset band value can be determined, thereby quickly determining the band mask corresponding to the preset band value, which improves the efficiency of the algorithm.

Exemplarily, the band mask obtained based on the above solution may be distributed in a matrix, and may have the same size as the matrix of the plurality of target pixels, so as to facilitate calculation. The principle will be described below.

Figure 5:
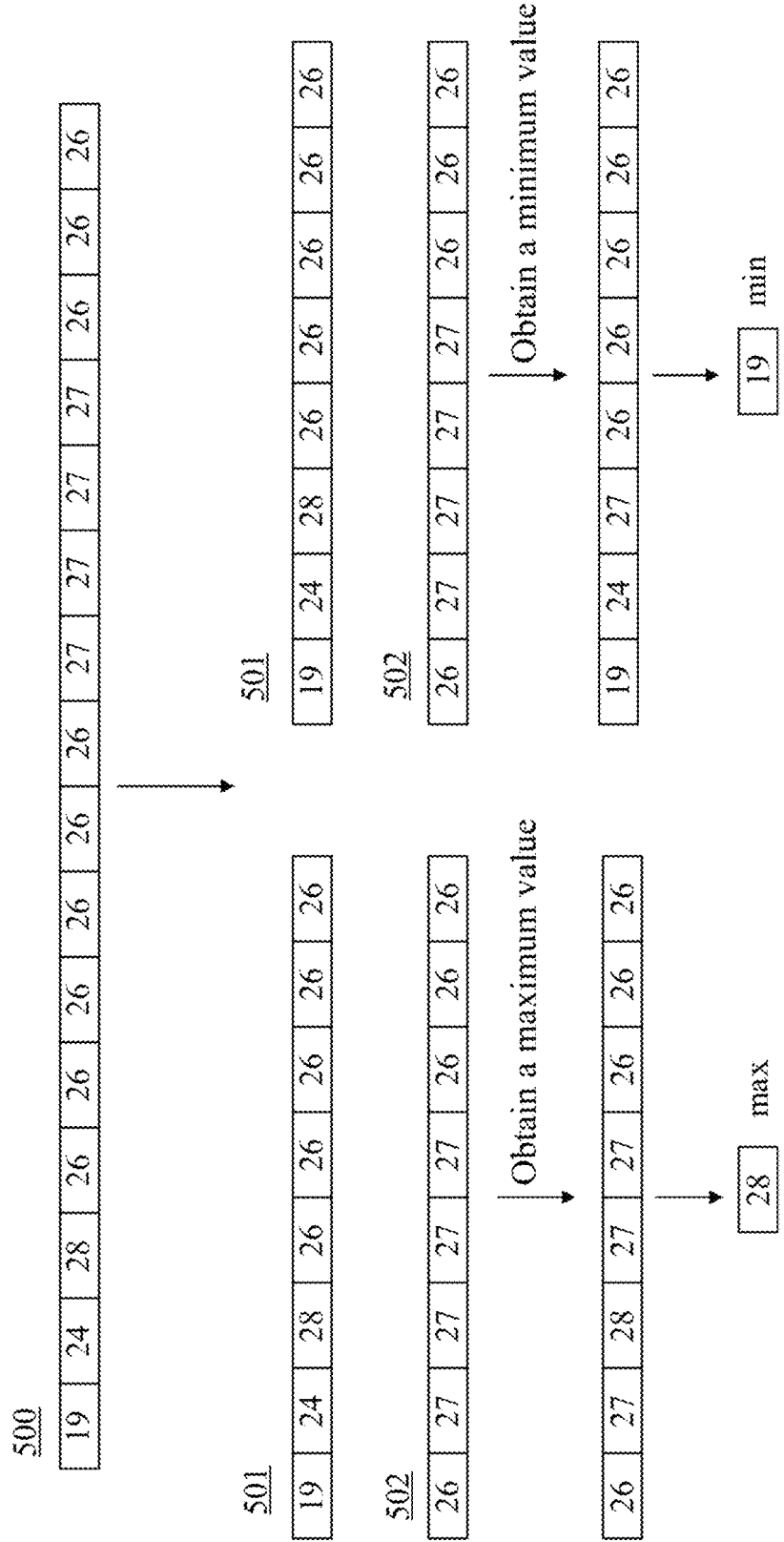
FIG. 5 is a schematic diagram of the principle of obtaining a maximum band value and a minimum band value of a plurality of target pixels according to some embodiments of the present disclosure.

The embodiment illustrated in FIG. 5 is still used as an example. The plurality of adjacent target pixels are the last row of pixels in FIG. 2e, after the maximum band value 28 and the minimum band value 19 of the plurality of target pixels (see the method described above) are determined, it is possible to determine the plurality of preset band values to be all integers 19, 20, 21, . . . , 26, 27, 28 within the interval [19, 28].

Figure 7:
FIG. 7 is a schematic diagram of the principle of determining a band mask according to some embodiments of the present disclosure.

In the example illustrated in FIG. 7, the preset band value 26 is used as an example. A band matrix 700 can be constructed, and the band matrix 700 is a row matrix including 16 elements and the values of the 16 elements are all the preset band value 26, and the band matrix 700 has the same size as the matrix of the plurality of target pixels 500. The band values of the plurality of target pixels 500 (for ease of description and understanding, reference numeral 500 is still used for indication in FIG. 7) are compared with the corresponding elements in the band matrix 700 one by one, and the value of the mask pixel of the band mask 701 corresponding to the preset band value is determined based on the comparison result. For example, when a band value of a specific target pixel of the plurality of target pixels 500 is 26, a value of the corresponding mask pixel of the band mask 701 may be set to a set value (for example, 1); and when a band value of another target pixel of the plurality of target pixels 500 is not 26, a value of the corresponding mask pixel of the band mask 700 may be set to 0. The band mask 701 may also be distributed in a row matrix including 16 elements, and a value of each element is a value of a mask pixel.

Exemplarily, the band information for each preset band value may include an accumulated residual sum and the number of pixels. The target image may be an image block in a reconstructed frame obtained by the encoder. The value of the target pixel in the target image is a reconstructed pixel value, and a difference between the value of the pixel in the original video frame and the value of the target pixel in the target image is the residual.

According to some embodiments, in a case that the band information includes an accumulated residual sum and the number of pixels, step S602 of calculating the band information for each of the plurality of preset band values based on the band values and the residuals of the plurality of target pixels may include: performing a calculation on the preset band value and the plurality of target pixels based on the residuals of the plurality of target pixels and the corresponding band mask to obtain the accumulated residual sum for the preset band value. The band mask can represent the position of the target pixel whose band value being the preset band value in the plurality of target pixels, which can implement the optimization of the instruction set, and the calculation for the plurality of target pixels at a time can be implemented to obtain the accumulated residual sum for the preset band value, thereby simplifying the computational complexity and improving the efficiency of the algorithm.

In an exemplary embodiment, performing the calculation on the preset band value and the plurality of target pixels to obtain the accumulated residual sum for the preset band value may include: constructing a residual matrix; multiplying the residual of each of the plurality of target pixels by a pixel value of a mask pixel in the corresponding band mask corresponding to the position of the target pixel; and storing the calculated result in the residual matrix. Therefore, the residuals obtained by simultaneously performing calculation for the plurality of target pixels can be stored in the residual matrix, and the residuals can be accumulated based on the residual matrix, which facilitates the implementation of the algorithm. In addition, the multiplication enables the binary representation length of the element values of the residual matrix to be doubled relative to the binary representation length of the residual of each target pixel, avoiding the overflow problem.

Figure 8:
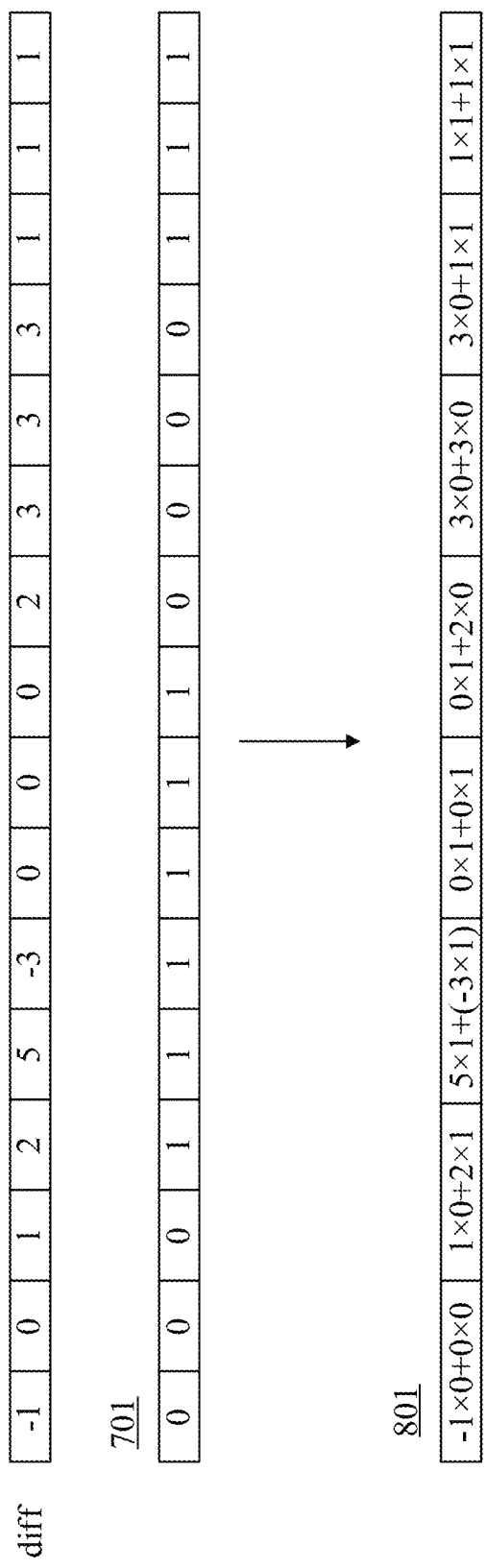
FIG. 8 is a schematic diagram of the principle of calculating an accumulated residual sum for a preset band value according to some embodiments of the present disclosure.

In the example illustrated in FIG. 8, 16 adjacent target pixels are distributed in a row matrix, that is, they are located in the same row. In order to facilitate the calculation, it may be set that the band mask 701 corresponding to the preset band value is also arranged in a row matrix, and the element value of 1 indicates that the band value of the corresponding target pixel of the plurality of target pixels is the preset band value, and the element value of 0 indicates that the band value of the corresponding target pixel of the plurality of target pixels is not the preset band value. The residual diff of each of the plurality of target pixels is multiplied by the pixel value of the mask pixel corresponding to the position of the target pixel in the corresponding band mask 701 to obtain the value of the corresponding element in the residual matrix 801. Since the value of the element in the band mask 701 that is corresponding to the target pixel whose band value being not the preset band value is 0, the value of the element in the band mask 701 multiplied by the residual diff of the target pixel is 0, which is not added to the accumulated residual sum for the preset band value. In addition, since the value of the element in the band mask 701 that is corresponding to the target pixel whose band value being the preset band value is 1, the value of the element in the band mask 701 multiplied by the residual diff of the target pixel is still diff, and the residual of the target pixel can be added to the accumulated residual sum for the preset band value.

It can be understood that step S602 is not limited to using one of the above methods to calculate the accumulated residual for the preset band value of the plurality of target pixels. For example, instead of constructing a residual matrix, the residual of each of the plurality of target pixels can be directly multiplied by the pixel value of the mask pixel corresponding to the position of the target pixel in the corresponding band mask, the plurality of products for the plurality of target pixels that are obtained by the multiplication are summed to obtain the accumulated residual sum for preset band value of the plurality of target pixels.

According to some embodiments, as shown in FIG. 8, the number of the plurality of adjacent target pixels may be an even number, and storing the calculated result in the residual matrix may include: summing a product for one of every two adjacent target pixels of the plurality of target pixels that is obtained by the multiplication and a product for the other one of the every two adjacent target pixels that is obtained by the multiplication, to obtain a plurality of sums; and storing the obtained plurality of sums in the residual matrix. Thus, the number of elements in the residual matrix can be reduced through the summation, reducing the occupied memory.

It can be understood that the number of the plurality of adjacent target pixels may alternatively be an odd number. In this case, for example, the pixel value of the first target pixel or the last target pixel may be directly stored in the residual matrix, and summation may be performed for the remaining target pixels with an even number using the above technical solutions, so as to reduce the occupied memory.

According to some embodiments, when the pixels of the target image are divided into the plurality of pixel groups and each pixel group includes a plurality of adjacent target pixels, the accumulated residual sum for the same preset band value in the plurality of pixel groups may be accumulated, that is, the residuals for the same preset band value of the plurality of pixel groups are summed, to obtain the accumulated residual sum for each preset band value of the target image, thereby reducing the computational complexity of the band information of the target image.

In an exemplary embodiment, in a case that the accumulated residual sum for the preset band value is obtained by constructing the residual, the residuals corresponding to the same preset band value of the plurality of pixel groups may be accumulated by accumulating the values of the elements in the residual matrix that are corresponding to the same preset band value of the plurality of pixel groups. The residuals obtained by simultaneously performing calculation for the plurality of target pixels can be stored in the residual matrix, and the residuals can be accumulated based on the residual matrix, thereby facilitating the implementation of the algorithm and reducing the computational complexity of the band information of the target image.

Exemplarily, as shown in FIG. 9a, an accumulated residual matrix corresponding to a plurality of band values may be constructed, the accumulated residual matrix may have the same size as the residual matrix, and the initial values of the elements in the accumulated residual matrix are all 0. For each pixel group, after the residual matrix corresponding to each of the corresponding plurality of preset band values is calculated, the value of each element in the residual matrix can be accumulated to obtain the corresponding element in the accumulated residual matrix corresponding to the preset band value, that is, a value of a specific element in the accumulated residual matrix corresponding to the preset band value is the sum of the values of the corresponding elements in the residual matrix that is corresponding to the preset band value and determined for the plurality of pixel groups. After the accumulated residual sums for the corresponding plurality of preset band values of the plurality of pixel groups have been calculated, the values of all the elements in the accumulated residual matrix corresponding to each preset band value can be summed to obtain the accumulated residual sum for the preset band value of the target image.

Accumulated residual matrices corresponding to a plurality of preset band values can be constructed sequentially based on the maximum band value and the minimum band value of each pixel group, so that a required accumulated residual matrix can be constructed according to actual requirements.

The above describes how to calculate the accumulated residual sum for the preset band value based on the corresponding band mask. Likewise, the number of pixels for the preset band value can also be calculated based on the corresponding band mask.

According to some embodiments, step S602 of calculating the band information for each of the plurality of preset band values based on the band values and the residuals of the plurality of target pixels may include: calculating the number of pixels for the preset band value based on the corresponding band mask. Since the band mask is capable of representing the position of the target pixel whose band value being the preset band value in the plurality of target pixels, it is possible to calculate the number of pixels for the preset band value based on the corresponding band mask.

Exemplarily, a plurality of mask pixels included in the band mask corresponding to each preset band value are in a one-to-one correspondence with the plurality of adjacent target pixels, a value of a mask pixel of the band mask that is corresponding to the target pixel whose band value being the preset band value in the plurality of target pixels is a set value, and a value of a mask pixel corresponding to the target pixel whose band value being not the preset band value in the plurality of target pixels is zero. The set value may be, for example, but not limited to, 1, to simplify the calculation of the band information. When a plurality of adjacent target pixels include at least one target pixel whose band value being the preset band value, the values of a plurality of mask pixels included in the band mask can be summed to obtain the number of the at least one target pixel (i.e., the number of pixels of the plurality of target pixels for the preset band value). It can be understood that if the plurality of adjacent target pixels do not include the target pixel whose band value being the preset band value, the values of the elements of the band mask corresponding to the preset band value are all 0, and the number of pixels for the preset band value is 0.

It can be understood that step S602 is not limited to using one of the above methods to calculate the number of pixels of the plurality of target pixels for the preset band value. For example, it is also possible to set a variable i with an initial value of 0, and sequentially determine whether the band value of each of the plurality of target pixels is equal to the preset band value, if so, i++ is executed, or if not, whether the band value of the next target pixel is equal to the preset band value continues to be determined, until the determination for the plurality of target pixels is completed, and the final value i is used as the number of pixels of the plurality of target pixels for preset band value.

According to some embodiments, when the pixels of the target image are divided into a plurality of pixel groups, and each pixel group includes the plurality of adjacent target pixels, the method may further include: accumulating the number of pixels for the same preset band value in the plurality of pixel groups to obtain the band information of the target image, thereby reducing the computational complexity of the band information of the target image.

Exemplarily, the total number of pixels for the same preset band value in the plurality of pixel groups may be accumulated by accumulating pixel values of a plurality of mask pixels of the band mask for the same preset band value in the plurality of pixel groups.

Referring to FIG. 9b, in a case that a plurality of target pixels are distributed in a matrix, accumulated number matrices corresponding to a plurality of band values can be constructed, the accumulated number matrix may have the same size as the matrix of the plurality of target pixels, and the initial values of the elements in the accumulated number matrix are all 0. For each pixel group, after the band mask corresponding to each of the plurality of preset band values is calculated, the value of each element in the band mask can be accumulated to obtain the corresponding element in the accumulated number matrix corresponding to the preset band value, that is, the value of a specific element in the accumulated number matrix corresponding to the preset band value is the sum of the values of the corresponding mask pixels in the band mask that is corresponding to the preset band value and obtained for the plurality of pixel groups. After the numbers of pixels of the plurality of pixel groups for the corresponding plurality of preset band values have been calculated, the values of all elements in the accumulated number matrix corresponding to each preset band value can be summed to obtain the number of pixels for the preset band value of the target image.

Accumulated number matrices corresponding to a plurality of preset band values can be constructed sequentially based on the maximum band value and the minimum band value of each pixel group, so that a required accumulated number matrix can be constructed according to actual requirements.

Figure 10:
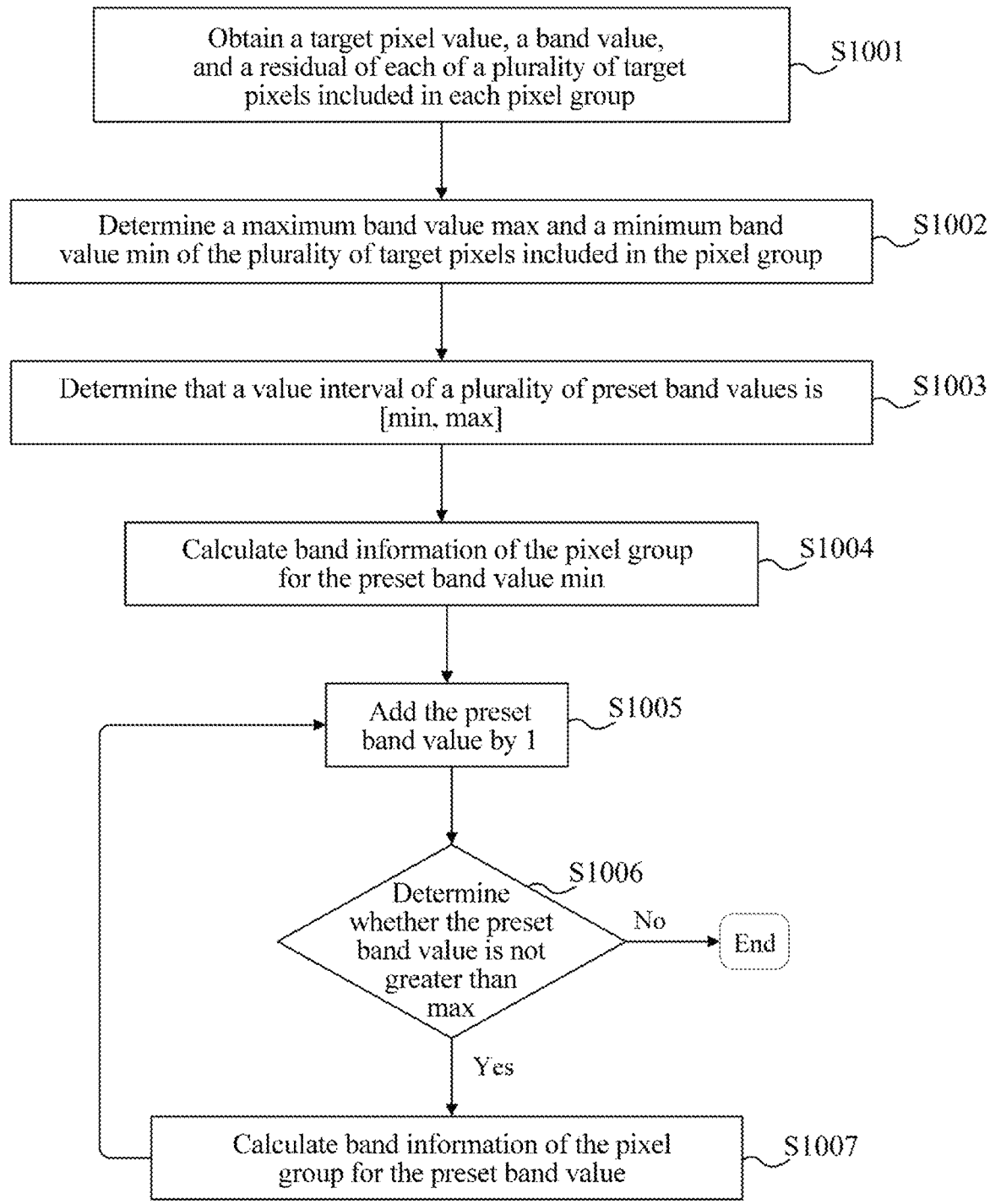
FIG. 10 is a flowchart of a method for sample adaptive offset according to some embodiments of the present disclosure.

As shown in FIG. 10, the process of the method for sample adaptive offset will be described in detail below in conjunction with an exemplary embodiment, which can be as follows.

In step S1001, each image block in the reconstructed frame is divided into a plurality of pixel groups, and a target pixel value, a band value, and a residual of each of a plurality of target pixels included in each pixel group are obtained.

In step S1002, a maximum band value max and a minimum band value min of the plurality of target pixels included in the pixel group are determined.

In step S1003, it is determined that the value interval of a plurality of preset band values is [min, max].

In step S1004, band information of the pixel group for the preset band value min is calculated.

In step S1005, the preset band value is added by 1.

In step S1006, whether the preset band value is not greater than max is determined, if not, the process ends, or if yes, step S1007 is performed.

In step S1007, the band information of the pixel group for the preset band value is calculated, and step S1005 and step S1006 are performed iteratively until the preset band value is greater than max.

The technical solutions of the present disclosure may be applied to, but not limited to, video encoding for live streaming or on-demand broadcast.

For video encoding, considering that a plurality of generally adjacent reconstructed pixels belong to similar bands, the technical solutions of the present disclosure narrows down the band range based on the maximum band value and the minimum band value, and can process 16 or 32 or more pixels simultaneously through the optimization of the instruction set, so that the memory reading and writing and numerical calculations in the band information statistics process can be greatly reduced. Memory reading and writing operations are very time-consuming and power-consuming for no matter Android/IOS of a mobile device, a PC, etc. According to experimental statistics, the calculation amount for band information statistics can be reduced by 40% by using the technical solutions of the present disclosure. In the prior art, the coding for band information statistics accounts for about 10% of the entire coding process in terms of time. A video encoding acceleration of about 4% for live streaming or on-demand broadcast can be directly implemented by using the technical solutions of the present disclosure, so that the power consumption can be reduced. Therefore, the technical solutions of the present disclosure are of great practical value.

Figure 11:
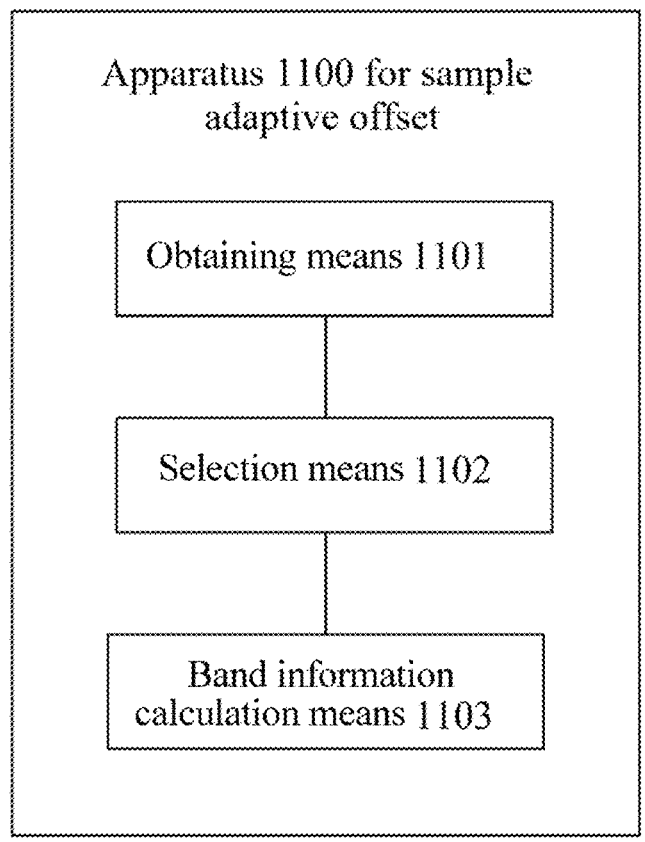
FIG. 11 is a structural block diagram of an apparatus for sample adaptive offset according to some embodiments of the present disclosure.

According to another aspect of the present disclosure, there is further provided an apparatus for sample adaptive offset. As shown in FIG. 11, the apparatus 1100 may include: an obtaining unit 1101 configured to obtain a band value and a residual of each pixel in a target image; a selection unit 1102 configured to select a plurality of adjacent target pixels from the target image; and a band information calculation unit 1103 configured to perform band information calculation operation for the plurality of adjacent target pixels, the band information calculation operation comprising: obtaining a maximum band value and a minimum band value of the plurality of target pixels; determining a plurality of preset band values based on the maximum band value and the minimum band value; and calculating band information for each of the plurality of preset band values based on the band values and the residuals of the plurality of target pixels.

According to another aspect of the present disclosure, there is further provided an electronic device, including: at least one processor; and a memory communicatively connected to the at least one processor, where the memory stores a computer program that, when executed by the at least one processor, implements the above method.

According to another aspect of the present disclosure, there is further provided a non-transitory computer-readable storage medium storing a computer program, where when the computer program is executed by a processor, the above method is implemented.

According to another aspect of the present disclosure, there is further provided a computer program product, including a computer program, where when the computer program is executed by a processor, the above method is implemented.

Figure 12:
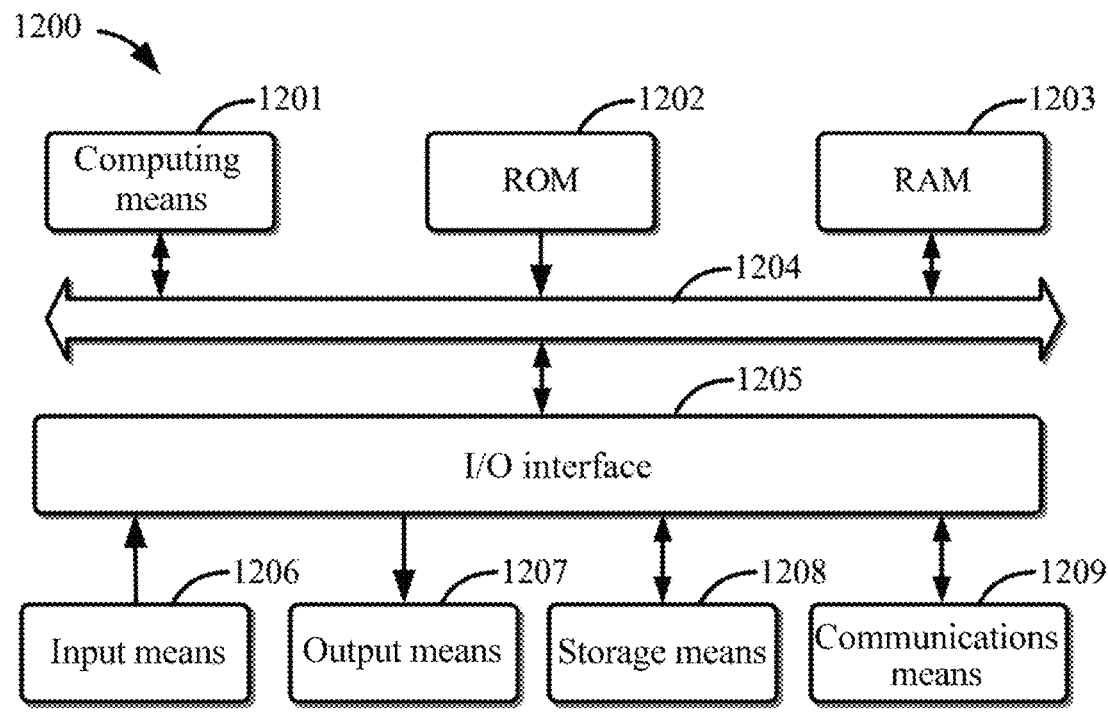
FIG. 12 is a structural block diagram of an exemplary electronic device that can be used to implement some embodiments of the present disclosure.

Referring to FIG. 12, a structural block diagram of an electronic device 1200 that may serve as a server or a client of the present disclosure is now described, which is an example of a hardware device that may be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 12, the device 1200 includes a computing unit 1201, which may perform various appropriate actions and processing according to a computer program stored in a read-only memory (ROM) 1202 or a computer program loaded from a storage unit 1208 to a random access memory (RAM) 1203. The RAM 1203 may further store various programs and data required for the operation of the device 1200. The computing unit 1201, the ROM 1202, and the RAM 1203 are connected to each other through a bus 1204. An input/output (I/O) interface 1205 is also connected to the bus 1204.

A plurality of components in the device 1200 are connected to the I/O interface 1205, including: an input unit 1206, an output unit 1207, the storage unit 1208, and a communications unit 1209. The input unit 1206 may be any type of device capable of entering information to the device 1200. The input unit 1206 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 1207 may be any type of device capable of presenting information, and may include, but is not limited to, a display, a speaker, a video/audio output terminal, a vibrator, and/or a printer. The storage unit 1208 may include, but is not limited to, a magnetic disk and an optical disc. The communications unit 1209 allows the device 1200 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, an 1302.11 device, a Wi-Fi device, a WiMAX device, a cellular communication device, and/or the like.

The computing unit 1201 may be various general-purpose and/or special-purpose processing components with processing and computing capabilities. Some examples of the computing unit 1201 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 1201 performs the various methods and processing described above, for example, steps S301 to S305 in FIG. 3. For example, in some embodiments, the method for sample adaptive offset may be implemented as a computer software program, which is tangibly contained in a machine-readable medium, such as the storage unit 1208. In some embodiments, a part or all of the computer program may be loaded and/or installed onto the device 1200 via the ROM 1202 and/or the communications unit 1209. When the computer program is loaded onto the RAM 1203 and executed by the computing unit 1201, one or more steps of the method for sample adaptive offset described above can be performed. Alternatively, in other embodiments, the computing unit 1201 may be configured in any other suitable manner (for example, by means of firmware), to perform the method for sample adaptive offset.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other categories of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the accompanying drawings, it should be appreciated that the method, system, and device described above are merely exemplary embodiments or examples, and the scope of the present invention is not limited by the embodiments or examples, but defined only by the granted claims and the equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A method, comprising:
obtaining a band value and a residual of each pixel in a target image;
selecting a plurality of adjacent target pixels from the target image; and
performing band information calculation operation for the plurality of adjacent target pixels, the band information calculation operation comprising:
obtaining a maximum band value and a minimum band value of the plurality of target pixels;
determining a plurality of preset band values based on the maximum band value and the minimum band value, the plurality of preset band values comprising the maximum band value and the minimum band value of the plurality of target pixels and one or more band values between the maximum band value and the minimum band value; and
calculating band information for each of the plurality of preset band values based on the band values and the residuals of the plurality of target pixels, comprising:
determining a band mask of the plurality of target pixels that corresponds to the preset band value, the band mask being capable of representing a position of a target pixel of the plurality of target pixels whose band value is the preset band value; and
performing a calculation on the preset band value and the plurality of target pixels based on the plurality of target pixels and the band mask corresponding to the preset band value to obtain the band information for the preset band value of the plurality of target pixels.

2. The method according to claim 1, wherein selecting the plurality of adjacent target pixels from the target image comprises:
dividing the pixels of the target image into a plurality of pixel groups, each pixel group comprising a plurality of adjacent target pixels.

3. The method according to claim 2, wherein the band information calculation operation is performed for the plurality of target pixels included in each pixel group.

4. The method according to claim 3, further comprising:
determining band information of the target image based on the respective plurality of band information of the plurality of pixel groups; and
encoding the band information of the target image for sending to a decoder.

5. The method according to claim 1,
wherein obtaining the maximum band value and the minimum band value of the plurality of target pixels comprises:
equally dividing the plurality of target pixels into a first part and a second part;
performing a maximum value obtaining operation between each target pixel in the first part and corresponding target pixel in the second part to obtain a plurality of first pixel values;
performing a minimum value obtaining operation between each target pixel in the first part and corresponding target pixel in the second part to obtain a plurality of second pixel values;
determining the maximum band value of the plurality of target pixels based at least on the plurality of first pixel values; and
determining the minimum band value of the plurality of target pixels based at least on the plurality of second pixel values.

6. The method according to claim 1, wherein a plurality of mask pixels included in the band mask are in a one-to-one correspondence with the plurality of adjacent target pixels, a value of a mask pixel of the band mask that corresponds to the target pixel of the plurality of target pixels whose band value is the preset band value is a set value, and a value of a mask pixel corresponding to the target pixel of the plurality of target pixels whose band value is not the preset band value is zero.

7. The method according to claim 1, wherein the plurality of target pixels are distributed in a matrix,
wherein determining the band mask of the plurality of target pixels that corresponds to the preset band value comprises:
constructing a band matrix having the same size as the matrix of the plurality of target pixels, values of elements in the band matrix being equal to the preset band value; and
determining the band mask based on a result of comparison between the band values of the plurality of target pixels and corresponding elements in the band matrix.

8. The method according to claim 1, wherein the band information comprises an accumulated residual sum and the number of pixels.

9. The method according to claim 8, wherein calculating the band information for each of the plurality of preset band values based on the band values and the residuals of the plurality of target pixels comprises:
performing a calculation on the preset band value and the plurality of target pixels based on the residuals of the plurality of target pixels and the corresponding band mask to obtain the accumulated residual sum for the preset band value.

10. The method according to claim 9, wherein performing the calculation on the preset band value and the plurality of target pixels to obtain the accumulated residual sum for the preset band value comprises:
constructing a residual matrix;
multiplying the residual of each of the plurality of target pixels by a pixel value of a mask pixel in the corresponding band mask corresponding to the position of the target pixel; and
storing the calculated result in the residual matrix.

11. The method according to claim 10, wherein storing the calculated result in the residual matrix comprises:
summing a product for one of every two adjacent target pixels of the plurality of target pixels that is obtained by the multiplication and a product for the other one of the every two adjacent target pixels that is obtained by the multiplication, to obtain a plurality of sums; and
storing at least the obtained plurality of sums in the residual matrix.

12. The method according to claim 10, wherein the pixels of the target image are divided into a plurality of pixel groups, each pixel group comprises the plurality of adjacent target pixels, and the method further comprises:
accumulating the accumulated residual sum for the same preset band value in the plurality of pixel groups to obtain the band information of the target image.

13. The method according to claim 8, wherein calculating the band information for each of the plurality of preset band values based on the band values and the residuals of the plurality of target pixels comprises:

calculating the number of pixels for the preset band value based on the corresponding band mask.

14. The method according to claim 13, wherein the pixels of the target image are divided into a plurality of pixel groups, each pixel group comprises the plurality of adjacent target pixels, and the method further comprises:
accumulating the number of pixels for the same preset band value in the plurality of pixel groups to obtain the band information of the target image.

15. The method according to claim 14, wherein the number of pixels for the same preset band value in the plurality of pixel groups is accumulated by accumulating pixel values of mask pixels of the band mask for the same preset band value in the plurality of pixel groups.

16. An electronic device, comprising:
at least one processor; and
a memory communicatively connected to the at least one processor, wherein the memory stores a computer program that, when executed by the at least one processor, causes the at least one processor to:
obtain a band value and a residual of each pixel in a target image;
select a plurality of adjacent target pixels from the target image; and
perform band information calculation operation for the plurality of adjacent target pixels, the band information calculation operation comprising:
obtaining a maximum band value and a minimum band value of the plurality of target pixels;
determining a plurality of preset band values based on the maximum band value and the minimum band value, the plurality of preset band values comprising the maximum band value and the minimum band value of the plurality of target pixels and one or more band values between the maximum band value and the minimum band value; and
calculating band information for each of the plurality of preset band values based on the band values and the residuals of the plurality of target pixels, comprising:
determining a band mask of the plurality of target pixels that corresponds to the preset band value, the band mask being capable of representing a position of a target pixel of the plurality of target pixels whose band value is the preset band value, and
performing a calculation on the preset band value and the plurality of target pixels based on the plurality of target pixels and the band mask corresponding to the preset band value to obtain the band information for the preset band value of the plurality of target pixels.

17. The electronic device according to claim 16, wherein selecting the plurality of adjacent target pixels from the target image comprises:
dividing the pixels of the target image into a plurality of pixel groups, each pixel group comprising a plurality of adjacent target pixels.

18. A non-transitory computer-readable storage medium storing a computer program that, when executed by a processor, causes the processor to:
obtain a band value and a residual of each pixel in a target image;
select a plurality of adjacent target pixels from the target image; and
perform band information calculation operation for the plurality of adjacent target pixels, the band information calculation operation comprising:
obtaining a maximum band value and a minimum band value of the plurality of target pixels;
determining a plurality of preset band values based on the maximum band value and the minimum band value, the plurality of preset band values comprising the maximum band value and the minimum band value of the plurality of target pixels and one or more band values between the maximum band value and the minimum band value; and
calculating band information for each of the plurality of preset band values based on the band values and the residuals of the plurality of target pixels, comprising:
determining a band mask of the plurality of target pixels that corresponds to the preset band value, the band mask being capable of representing a position of a target pixel of the plurality of target pixels whose band value is the preset band value; and
performing a calculation on the preset band value and the plurality of target pixels based on the plurality of target pixels and the band mask corresponding to the preset band value to obtain the band information for the preset band value of the plurality of target pixels.

* * * * *